United States Patent [19]
Petersen

[11] 3,805,204
[45] Apr. 16, 1974

[54] TRACTIVE ELECTROMAGNETIC DEVICE
[75] Inventor: Christian C. Petersen, Westwood, Mass.
[73] Assignee: Polaroid Corporation, Cambridge, Mass.
[22] Filed: Apr. 21, 1972
[21] Appl. No.: 245,884

[52] U.S. Cl. ............................... 335/255, 335/258
[51] Int. Cl. .............................................. H01f 7/08
[58] Field of Search ........... 335/255, 258, 261, 279, 335/257, 264, 262

[56] References Cited
UNITED STATES PATENTS

| | | | |
|---|---|---|---|
| 1,436,639 | 11/1922 | Bindshedler | 335/262 |
| 3,505,628 | 4/1970 | Allen | 335/255 |
| 1,226,697 | 5/1917 | Rinsche | 335/262 |
| 3,381,250 | 4/1968 | Weathers | 335/255 |
| 3,168,242 | 2/1965 | Diener | 335/261 X |
| 2,407,603 | 9/1946 | Derungs | 335/261 X |
| 2,407,963 | 9/1946 | Persons | 335/261 |

*Primary Examiner*—George Harris

[57] ABSTRACT

A solenoid for use within the exposure control system of a thin, compact automatic camera. The solenoid develops a desirable flat force-stroke characteristic while operating under limited power supplies. To achieve this necessary characteristic, the confronting end faces of the armatures of the solenoid are configured to form peripherally disposed extensions and complementary recesses having corresponding relatively shallow conical confronting surfaces. Additionally, the end faces are formed to provide peripherally disposed seating surfaces to permit nested holding forces under significantly reduced current levels.

27 Claims, 10 Drawing Figures

TRACTIVE ELECTROMAGNETIC DEVICE

BACKGROUND OF THE INVENTION

A U.S. Pat. No. 3,714,879 entitled "Reflex Camera" by E. H. Land, V. K. Eloranta and I. Blinow, describes a very thin and compact, yet highly automated photographic camera. Suited for convenient carrying in the pocket of a garment, this camera is designed to operate in a modified reflex fashion. Reflex viewing and subsequent exposure by the camera are carried out within a somewhat involved series of operational events, the combination of which defines a single photographic cycle. For instance, when a start button is depressed, the exposure chamber of the camera is secured while reflex components therein alter its operational mode from one suited for viewing and focusing to an exposure mode. Following an ensuing exposure, the exposure chamber of the camera is again secured while an electric motor realigns the components of the camera to assume a viewing mode and simultaneously powers a processing station. Following processing and the final mode conversion, the power supply of the camera is shut down to terminate the photographic cycle.

This power supply for the very thin camera is present at a primary battery of very thin and flat configuration which is packaged within each cassette or disposable container of film. The power capacity of such a battery is necessarily limited to meet the thin and compact design criteria of the camera. A typical design for the battery and film supply package is described in U.S. Pat. No. 3,543,662.

The logic required of the shutter mechanism for such a camera is somewhat unusual, inasmuch as the shutter must be normally open to permit viewing and focusing and must remain closed for purposes of securing an exposure chamber during periods of operational mode conversion as well as processing. An exposure system ideally suited to carry out such logic is described in a U.S. Pat. by V. K. Eloranta, No. 3,641,889. This exposure system is characterized in calling upon a tractive electromagnetic device, such as a solenoid, to supply shutter actuating drive. Through the use of a solenoid drive operating in conjunction with a spring biased shutter arrangement, a normally fully open unenergized shutter status is available for the camera for viewing and focusing. Further, the solenoid driven shutter system allows for the development of dual exposure parameter regulation (aperture and taking speed) of the exposure value of any given exposure. For example, following an initial energization of the solenoid to secure the exposure chamber of the camera for mode conversion purposes, it is deenergized to permit the blades of the exposure mechanism to progressively open under spring bias to define a gradually enlarging aperture. An exposure interval is terminated by again energizing the solenoid to rapidly drive the exposure mechanism blades into a closed orientation. The solenoid remains energized to secure the exposure chamber following an exposure interval for a length of time sufficient to permit film unit processing as well as final mode conversion.

In view of the limited power supply available from the cassette contained battery of the photographic system, the control cycle of the camera contains a "power down" feature whereby sustaining current maintaining the energized status of the shutter solenoid during processing and mode conversion is dropped significantly.

The solenoid called upon for duty within the above-described complex photographic cycle must meet very critical performance criteria. Relative tractive effort exerted by the device must evidence a force-stroke characteristic which complements the spring driven force characteristics of the shutter mechanism which it actuates. Further, these characteristics must be derived from a tractive electromagnetic device, the size of which is severely limited by the requisite thinness and compactness of the housing within which it is situated. Accordingly, the exposure mechanism operating in conjunction with the solenoid is designed to evidence a relatively flat rate force characteristic and the miniature solenoid is then called upon to evidence a corresponding flat rate force-stroke characteristic. With such a complementary electrical-mechanical interface within the system, a necessary power density permitting requisite compactness may be achieved.

The solenoid of the above-described exposure system must also be capable of developing adequate sustaining power under the noted "power down" intervals of a photographic cycle. During such intervals, current input to the excitation winding of such a solenoid may be dropped to less than one tenth of its initial value while the solenoid is called upon to exhibit a static hold-in force value of magnitude fully adequate to resist a static spring force exerted from the exposure mechanism.

Of particular importance to applications in the photographic field, such solenoids must exhibit requisite performance characteristics while remaining fabricable utilizing high volume automatic production techniques. Only where such production techniques are available can the solenoid driven shutters be utilized in cameras suited for use within the popular price market.

SUMMARY OF THE INVENTION

The instant invention provides a tractive electromagnetic device suited for operation in conjunction with the exposure mechanism of a photographic exposure control system. Exhibiting a desired relatively flat force-stroke characteristic, the solenoid device of the invention performs ideally as a component of a spring biased exposure regulating assembly. While providing requisite pull-in characteristics during its dynamic operation, the solenoid device of the invention also exhibits necessary sustaining force characteristics when the movable armature or plunger thereof is fully exercised or retracted to its seated orientation and when the device is powered at significantly lowered input current levels.

Another feature and object of the invention is to provide a solenoid device suited for use within the limited confines of the housing of an exposure control mechanism of a thin, compact camera. The solenoid is particularly characterized in being fabricable using high volume automatic assembly production techniques.

A further feature and object of the invention is to provide a solenoid having an excitation winding incorporating a centrally disposed stationary armature and movable plunger. The armature and plunger are generally cylindrically shaped having confronting end faces which are mutually internestable at a seated or retracted orientation of the plunger. The end faces are formed to define, when nested, a working gap interface of conically surfaced frustum shape. The apex half-angle slope of the conical surface of this frustum shape is selected for deriving an optimized working gap linkage suited to provide flux linkage drive during a first increment of movement of the plunger. The working gap interface may also include a second conically surfaced working gap which is disposed internally of the noted frustum shaped gap. The second surface is configured having a slope representing a cone apex half-angle greater than the first interface and which is provided to establish flux linked drive during an ensuing increment of movement of the plunger following its first increment of movement.

Another feature and object of the invention is to provide a solenoid having an excitation winding along with a stationary armature and plunger disposed internally thereof. Formed having a generally cylindrical shape, the armature and plunger are configured to define mutually abuttable seating surfaces formed inwardly from their external periphery. Thus located, the seating surfaces may be formed within the end faces of the plunger and armature using simplified production techinques. The peripherally disposed seating surfaces also are ideally located with respect to the flux paths of highest density of the device. Such an arrangement improves the static holding characteristics of the solenoid where it is operated within an exposure control system having a "power down" operational interval.

Another object of the invention is to provide a tractive electromagnetic device or solenoid suited for use within the exposure control system of a photographic camera. The solenoid comprises an excitation winding as well as stationary and movable armatures. These armatures are provided with confronting end faces having complementary extensions and recesses which, upon energization of the excitation winding, are movable into a seated internesting configuration. The extension of one end face is formed as a right conical frustum, the circular base of which is selected having a diameter less than that of the end face from which it protrudes. The confronting end face is formed having a complementary frustum shaped recess nestable over the extension. The latter end face also is formed having a conically surfaced extension, the slope of which is selected as greater than that of the surface of the frustum. This latter extension is nestable within a complementing recess of the confronting end face. Seating surfaces are formed inwardly from the outer peripheries of each of the confronting end faces and provide highly efficient flux linkage when the armatures are fully seated.

Other objects of the invention will in part be obvious and will in part appear hereinafter.

The invention, accordingly, comprises the system possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION

The design of a solenoid or similar tractive electromagnetic device is essentially a heuristic procedure, involving the variable performance parameters of force, plunger stroke and plunger travel time. When these parameters are further constrained within the operational boundaries required of the exposure control mechanism of a highly compact photographic system, the evolution of a successful shutter actuating solenoid device becomes most elusive. To gain some insight into the solenoid design requirements for such an application, a preferred application for such a drive technique is initially described herein.

Figure 1:
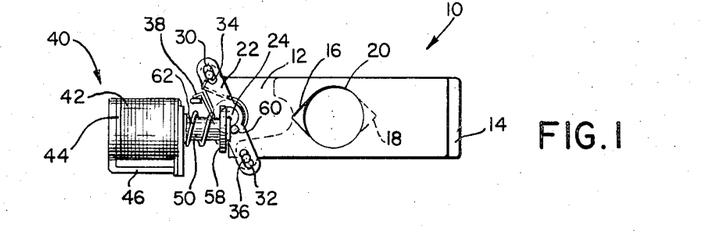
FIG. 1 is a partial front elevational view of an exposure control mechanism incorporating the solenoid of the instant invention and showing an orientation of components providing for the unblocking of an exposure aperture.
Figure 2:
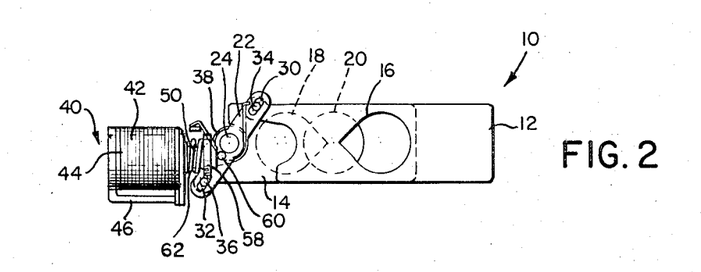
FIG. 2 is a view of the exposure mechanism of FIG. 1 showing the components thereof as they are oriented to provide for the complete blocking of an exposure aperture.

Referring to FIGS. 1 and 2, certain components of the light valve mechanism of a solenoid actuated exposure control system are illustrated generally at 10. These components include two adjacent and slidably mounted exposure mechanism blades 12 and 14. Blades 12 and 14, respectively, are configured having teardrop shaped openings 16 and 18 formed therewithin. Openings 16 and 18 are positioned within respective blades 12 and 14 in a reversed sense such that, where they overlap, they combine to form a symmetrically configured aperture opening about a centrally disposed fixed opening or aperture 20 positioned within the optical path of a camera.

The symmetry of the aperture openings defined by blades 12 and 14 is provided as a consequence in their mutual connection with an actuator resembling a "walking beam" as shown at 22. Walking beam 22 is rotatably mounted within an exposure housing (not shown) upon an upstanding stud shown generally at 24. Elongate slots as at 30 and 32 are formed in the outward tip portions of beam 22 for the purpose of providing connection with pins 34 and 36 extending, respectively, from blades 12 and 14. Thus interconnected, blades 12 and 14 may move simultaneously and in correspondence with each other to define symmetrically configured, variable aperture openings of progressively varying value over exposure opening 20. Elongate slots 30 and 32 serve the function of accommodating the horizontally restricted movement of blades 12 and 14 along cords extending through the locus of rotation of the tips of beam 22.

Walking beam 22 is biased to urge blades 12 and 14 to move into the terminal light blocking position shown in FIG. 2 by a spirally or helically wound relatively flat rate closing spring, a portion of which is revealed at 38. Spring 38 is positioned behind beam 22 and is slidably wound and interconnected to assert the noted bias at a relatively constant force throughout the travel of blades 12 and 14 from a fully open to a fully closed position.

Figure 4:
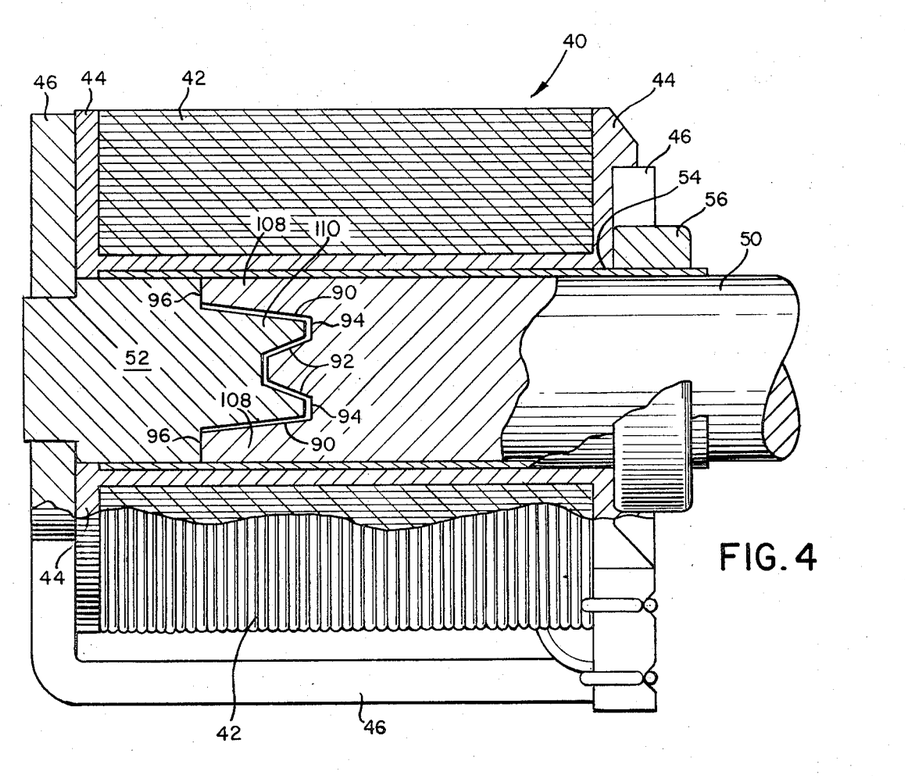
FIG. 4 is an elevational view of a solenoid according to the invention with portions broken away to reveal internal structure.

Walking beam 22 is further biased to normally position blades 12 and 14 in the fully open configuration shown in FIG. 1 in consequence of its association with a solenoid device shown generally at 40. Solenoid 40, revealed in more enhanced detail at FIG. 4, is generally structured to include an excitation windng 42 spirally wound about an insulator supporting bobbin 44. Bobbin 44, in turn, is positioned within a U-shaped frame 46. To enhance necessary compactness of the device, frame 46 is of unusually thin configuration while retaining the necessary function of forming a significant portion of the magnetic circuit of the solenoid. Symmetrically disposed externally of excitation winding 42 is a cylindrically shaped movable armature or plunger 50 and a cylindrically shaped stationary armature or plug 52. (FIG. 4) Plunger 50 slidably rides upon the internal surface of a non-magnetic liner 54 forming the internal hollow core of bobbin 44. An annular flux ring 56 is positioned over the forward end of liner 54 and in contact within the forward face of frame 46 for the purpose of improving the magnetic flux circuit path linkage between frame 46 and plunger 50. The presence of ring 56 permits the use of the earlier discussed relatively thinly dimensioned material for frame 46.

As illustrated in FIG. 1, solenoid 40 is aligned such that plunger 50 may travel outwardly in a manner permitting the surface of a striker cap 58 fixed to its tip to abuttably contact the surface of a striking pin 60 extending from beam 22. A mechanical bias asserting the noted contact between striker cap 58 and striking pin 60 is provided by an opening spring 62 constrained between the inward face of striker cap 58 and frame 46. Spring 62 is selected as a compression spring having a high spring index, for instance, over about 20, permitting it to exhibit a relatively flat rate. The spring is additionally selected having a loading characteristic exhibiting higher force values than those exhibited by closing spring 38. Accordingly, when mechanism 10 is in a normal. unenergized state, the bias exerted by opening spring 62 retains blades 12 and 14 in the fully open condition shown in FIG. 1 against the opposing bias exerted from closing spring 38. When excitation winding 42 of solenoid 40 is energized, plunger 50 is rapidly retracted to an internally seated position against plug 52. With this retracting movement, opening spring 62 is compressed and the abutting contact between pin 60 and striking cap 58 is negated. As a consequence, walking beam 22 is rotated under the bias of closing spring 38 to, in turn, drive blades 12 and 14 to the orientations shown in FIG. 2 wherein aperture 20 is fully blocked. Mechanism 10 is described in enhanced detail in a copending application for U.S. Pat. by L. G. Douglas, entitled Electromagnetically Actuated Exposure Control Mechanism Ser. No. 245,801, filed Apr. 21, 1972 and assigned in common herewith.

Figure 3:
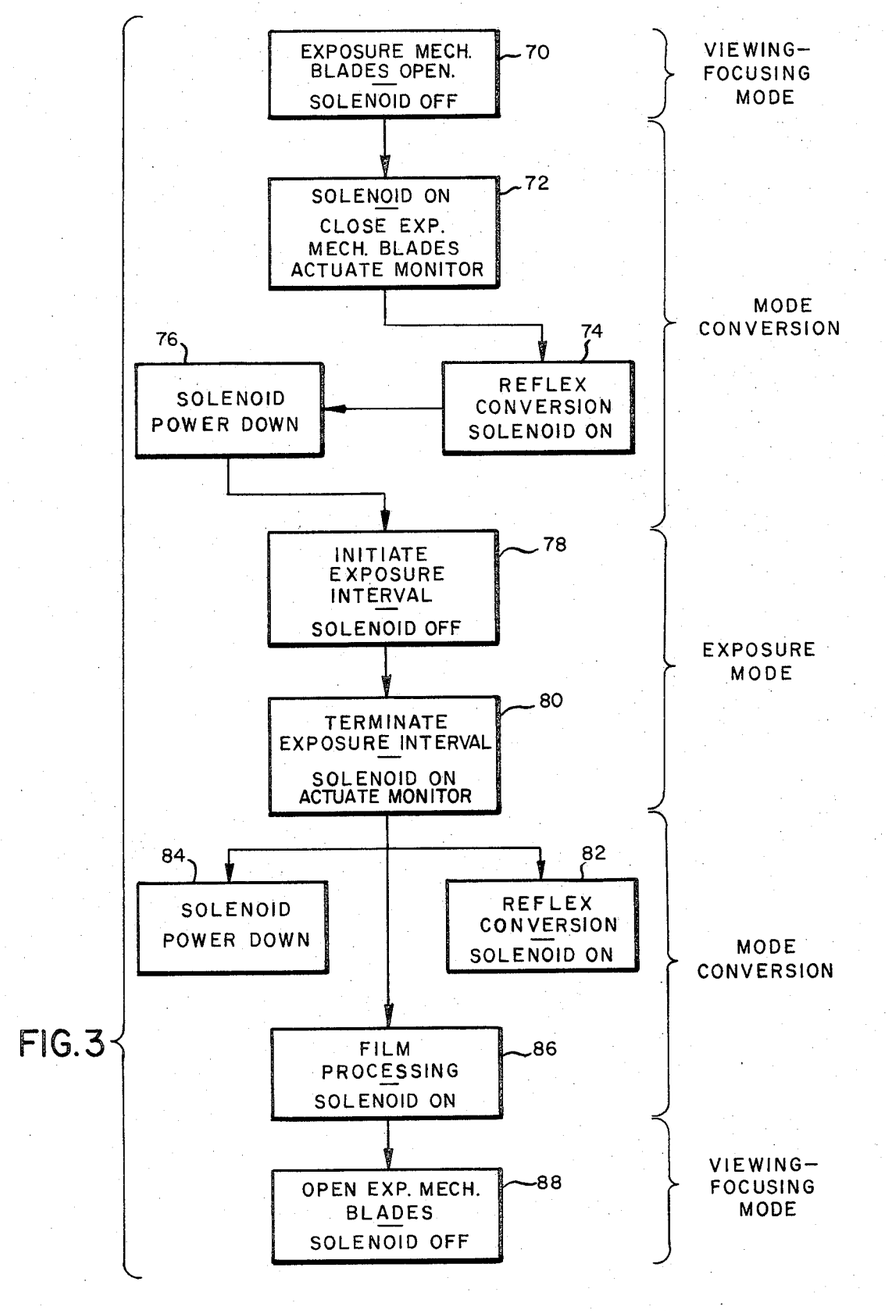
FIG. 3 is a block logic diagram describing a photographic cycle for a camera within which the solenoid of the instant invention may be employed.

Referring to FIG. 3, a block logic diagram outlining the operations required of mechanism 10 within the earlier described form of reflex camera is provided. Prior to the commencement of a photographic cycle, aperture 20 of the exposure mechanism is fully unblocked such that optimum lighting might be obtained for viewing and focusing purposes. During this viewing-focusing mode, solenoid 40 is deenergized and blades 12 and 14 assume the unblocking orientation shown in FIG. 1. This initial operational mode is shown in block 70. establish an optical path for A photographic cycle is initiated with the depression of an appropriate actuator switch which causes the energization of excitation winding 42 of solenoid 40. As labeled at block 72, solenoid 40 is turned "on" to retract plunger 50 and effect the closure of blades 12 and 14 as shown in FIG. 2. When blades 12 and 14 are fully closed, an appropriate monitor is actuated to signal that the exposure chamber of the camera is secured to permit mode conversion to be carried out. Accordingly, as labeled at block 74, reflex components within the camera are reoriented to establish an optical path exposing a film unit. Solenoid 40 remains energized and, at an appropriate point in time during mode conversion, a solenoid power-down feature is actuated as depicted at block 76. As described in more detail in copending application for U. S. Pat. by C. H. Biber and E. K. Shenk, Ser. No. 163,948, entitled "Photographic Apparatus With Solenoid Powered Instrumentalities" and assigned in common herewith, the power-down feature effects a significant lowering of the excitation current introduced to winding 42 when plunger 50 is at or closely proximate a seated position against plug 52. The power-down arrangement is necessary where, due to the highly compact nature of the camera involved, only a very limited power supply is available for the system.

Once mode conversion is carried out, an exposure mode is commenced with the deenergization of winding 42 of solenoid 40. As depicted at block 78, with the deenergization of winding 42, plunger 50 is driven outwardly by opening spring 62 to contact striking pin 60 and drive walking beam 22 toward the open position illustrated in FIG. 1 against the bias exerted by closing spring 38. As blades 12 and 14 open, their respective openings 16 and 18 cooperate to gradually enlarge the exposure opening at aperture 20. When an appropriate light detecting circuitry determines a proper exposure has been made, winding 42 of solenoid 40 is again energized to cause the retraction of plunger 50 into the seated position shown in FIG. 2. This exposure terminating procedure is depicted at block 80. As discussed earlier, with this plunger retraction, the abutting contact between striker cap 58 and pin 60 15 negated, thereby permitting walking beam 22 to be driven only by the consistent and repeatable force values evidenced at closing spring 38. Such a drive arrangement considerably improves the reliability of the exposure system. As is apparent, it is necessary that solenoid 40 be operative to retract plunger 50 at a rate and within a time parameter sufficient to assure negation of the noted contact. Further, such operation should be available under the varying power input levels typically available from thin, compact primary batteries.

When monitors within the photographic control system detect that blades 12 and 14 fully block aperture 20, the camera the noted enters a mode conversion phase, solenoid 40 remaining energized as shown at block 82, while reflex conversion again is carried out. To conserve energy, the power-down feature restricting current flow to winding 42 is reinserted as shown at block 84. Solenoid 40 remains energized in its power-down state while reflex conversion, as shown at block 82, takes place, as well as while an exposed film unit is processed through a motorized processing station, as depicted at block 86. Upon completion of both of these functions, appropriate monitoring within the control system deenergizes winding 42 of solenoid 40 to permit compression spring 62 to drive walking beam 22 and attached blades 12 and 14 into the unblocking orientations shown in FIG. 1. The initial viewing-focusing mode is reestablished with this deenergization as depicted at block 88.

From the foregoing, it may be seen that, for a solenoid or similar tractive electromagnetic device to operate within a photographic system of the type described, it must exhibit a high efficiency permitting its operation with very restricted power supplies. Further, such a device must derive a relatively flat force-stroke characteristic selected for operation in conjunction with an associated flat rate spring system. This arrangement optimizes power densities while minimizing the bulk of the solenoid structure. In the latter regard, the bulk of any such solenoid is severely restricted where use is contemplated in modern, thin compact camera structures. As another requisite criteria for the devices, the pull-in rate of the plunger must be rapid enough to effect essential negation of contact between its striker surface and the spring driven exposure mechanism. Failure in this parameter would result in aborted exposures. As a next criterion, the solenoid must be designed such that its plunger remains in a nested, seated position under power-down conditions wherein excitation current is significantly reduced and wherein the solenoid must overcome a static spring force. As another criteria for the design for such solenoids, fabrication must be available at great volume and at low unit cost to permit their use in cameras intended for the popularly priced photographic market.

As revealed in FIG. 4, plunger 50 and corresponding plug 52 are configured having confronting end faces each of which, in turn, is formed having selectively structured extensions and recesses. Illustrated in the figure in a fully seated and nested orientation, the cylindrically shaped end faces define a major working gap interface 90 which is generally shaped as a right conical frustum. The apex of this frustum is additionally configured having a minor cone working gap interface as shown at 92. The minor cone working gap interface 92 is positioned coaxially with plunger 50 and plug 52 and is configured having a base of lesser diametral extent than the top of frustum 90. Thus configured, an annular shaped end surface working gap interface is defined at 94. A further characteristic of the confronting end faces of plunger 50 and plug 52 resides in the provision of confronting seating surfaces which are contactible at the plane defined by line 96. These seating surfaces are formed inwardly from the respective peripheries of the end faces of plunger 50 and plug 52. When plunger 50 is fully retracted, contact as shown at 96 is effected between opposing annular shaped surfaces. In the description to follow, the individual conical surfaces serving to establish working gaps 90 through 96 are described separately in conjunction with their particular flux linking function.

Figure 5:
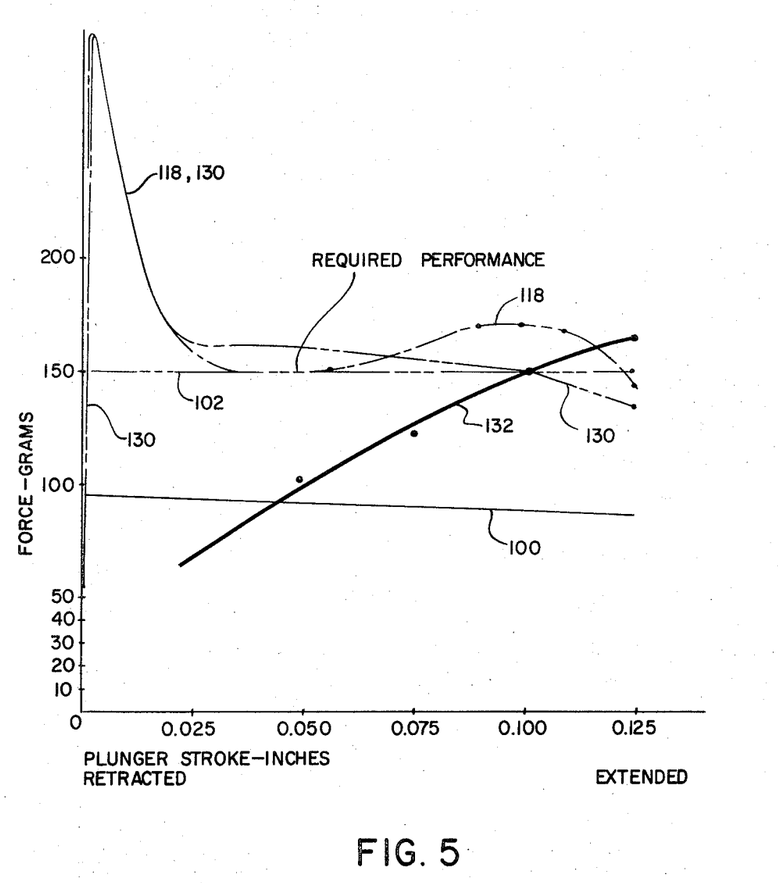
FIG. 5 is a representation of a force-stroke characteristic of the solenoid of the instant invention as well as others.

Referring to FIG. 5, a graphical analysis of the force characteristics under which the solenoid of the invention is called upon to perform is more explicitly revealed. Curve 100 of the chart shows the loading characteristic of opening spring 62. Configured having a high spring index, spring 62 evidences a relatively flat rate characteristic exhibiting a load of about 85 grams at the extended stroke position of plunger 50 and a force of about 95 grams when plunger 50 is in its seated or fully retracted position. To adequately retract in the required time against this spring load, plunger 50 is required to provide at least about a 150 gram pulling force as exhibited by horizontal line 102. The differential in force between curves 100 and 102 represents that force which should be available to retract spring 62 resulting in closing of shutter blades 12 and 14. It may be noted, in particular, that this force must remain adequate not only at the fully extended position of the plunger, but also at intermediate apertural values as may be established in accordance with various scene brightness levels. The necessary force differential for these intermediate exposure values points to the importance of providing complementing flat force characteristics for both spring and solenoid.

Figure 6:
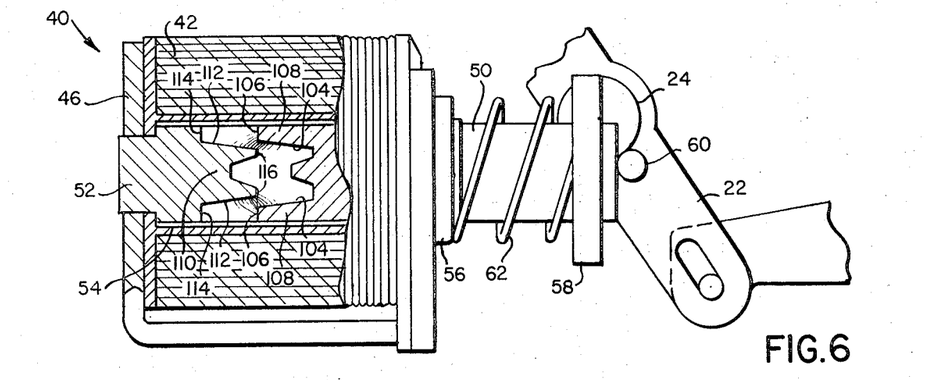
FIG. 6 is an elevational view of the solenoid of FIG. 4 with portions broken away to reveal the orientation of confronting end faces at the commencement of energization thereof.

Looking additionally to FIG. 6, plunger 50 is shown oriented at its extended initial position as encountered when solenoid 40 is deenergized. From this initial position, plunger 50 is called upon to be driven through a full stroke which is represented as 0.125 inch. At the commencement of energization of winding 42, an increment of time is required in order to achieve a given flux build-up. Accordingly, it is necessary to provide a design which overcomes this initial lag in order to derive a fully adequate acceleration at the initial position. Note in this regard, that the end face of plunger 50 is situated at approximately the mid-point of excitation winding 42. When so placed at approximately this midpoint, the end face of plunger 50 takes advantage of the most efficient flux build-up concentration location of the entire winding 42. Note further that the recess within the end face of plunger 50 is formed as a conically surfaced right frustum and this frustum-shaped recess, when combined with the outer periphery of plunger 50, describes an annulus-shaped cross section of varying size depending upon the slope of inner conical surface 104. With this cross sectional arrangement, the tip of the end face of plunger 50 is formed as a blunt annulus shaped seating surface 106. The area of this seating surface as well as the convergent apex half angle of the conical surface 104 are found to be of high importance in achieving a necessary force-stroke characteristic. It has been empirically determined that this half angle is preferably about 8°. For instance, the angle of the illustrated embodiment is 8°–03'. Further, it has been determined that the area of seating surface 106 should be about 50% of the total cross-sectional area of the end face. With the above-described structure, the solid extension 108 formed within the end face of plunger 50 is ideally positioned at the periphery of the cylindrically shaped plunger 50 so as to take full advantage of the enhanced flux characteristics at the inner periphery of winding 42. Further, the resultant solid mass represented by extension 108 is of such quantity as to avoid undersirable saturation. By avoiding such saturation, the efficiency of the entire solenoid is greatly enhanced.

The confronting end face of stationary armature or plug 52 is formed having an extension corresponding to the recess in the end face of plunger 50. Shown at 110, this extension is formed as a right frustum having a conical surface whose convergent apex half angle is selected as about 8° in nesting conformity and in correspondence with that selected for surface 104. The end face of plug 52 also is configured having an annulus-shaped seating surface 114 formed inwardly from its cylindrical periphery. Seating surface 114 corresponds generally in size with the seating surface 106 of plunger 50. Note, as before, that this surface is located at the outer periphery of the end face to take full advantage of the enhanced development of flux at that location.

Inasmuch as the development of a solenoid represents a somewhat empirical procedure, the working gap flux linkage established at this initial position, as represented in FIG. 6, can only be approximated. However, lines representing an assumed working gap flux path are shown in the drawing to extend from seating surface 106 to conical surface 112, as well as from the blunt annulus shaped end surface 116 of the end face of plug 52. The resultant starting force generated at this position is represented by the extended stroke location of a force-stroke curve 118 reproduced in FIG. 5. Note that the force value commences at about 142 grams and immediately rises with the first increment of motion of plunger 50 to well above the 150 gram level.

Figure 7:
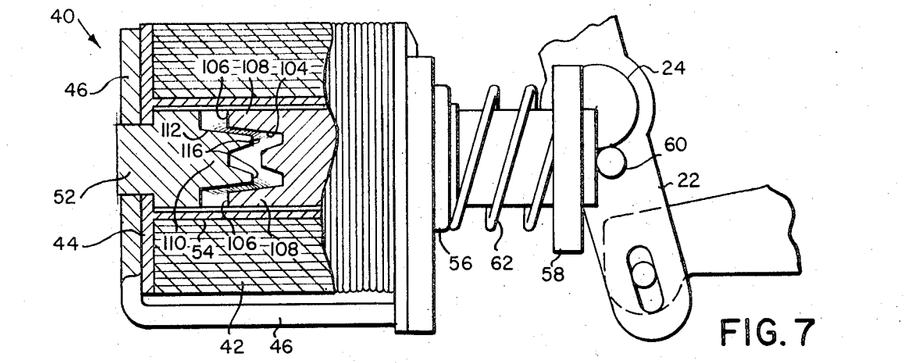
FIG. 7 is an elevational view of the solenoid of FIG. 6 with portions broken away to show the orientation of components following an initial period of energization of the excitation winding thereof.

As plunger 50 reaches about mid-stroke or about 0.062 inches, as shown in FIG. 7, major flux linkage density is assumed to evolve between shallow conical surfaces 104 and 112. Additionally, tractive forces are assumed to be generated between surface 112 and seating surface 106 as well as between end surface 116 and shallow surface 104. The force generated at this location is shown in FIG. 5 to be about 160 grams.

Figure 8:
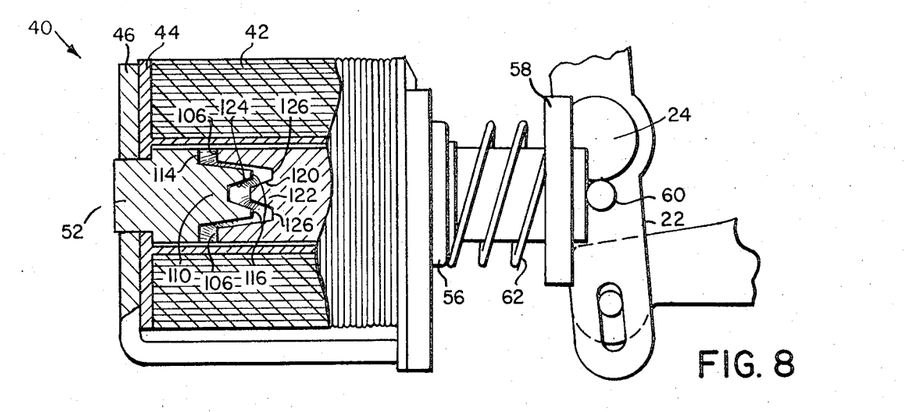
FIG. 8 is an elevational view of the solenoid of FIG. 7 with portions broken away to reveal the orientation of its components during another portion of an excitation stroke thereof.

As plunger 50 progresses from a mid-stroke towards a seated or nested and retracted position, its force-stroke characteristic is affected by the magnetic interaction of the conical surface 120 of extension 122 in the end face of plunger 50 with a corresponding conical surface 124 defining a recess within extension 110. Extension 122 and its corresponding recess 124 are configured having convergent conical apex half angles of about 23°, a slope much greater than that of surfaces 104 and 112. For the illustrated embodiment, this slope is 22°–30'. As a consequence, the extension and its recess are necessarily of shorter height than extension 110 and its corresponding recess. To accommodate for end surface 116, the base of extension 122 is restricted in diameter to establish a corresponding annular shaped end surface 126. For more typical magnetic iron plunger and plug materials the presence of extension 122 and its corresponding recess is required to maintain requisite stroke forces from about the noted mid-point at 0.062 inch to about 0.025 inch of stroke.

Beyond this point toward the nested and fully seated position, considerably enhanced working gap flux linkages are established between surfaces 120 and 124 as well as between the truncated top portion of extension 122 and surface 124, between surfaces 116 and 120 and between surfaces 114 and 106. Resultant correspondingly high force values evidenced over this final portion of the plunger 50 stroke are depicted at curve 118 in FIG. 5. These higher "end-of-stroke" forces are of considerable value where monitor actuation duties, as described at blocks 72 and 80, are required. For instance, cap 58 may be called upon to actuate or drive a switch during this final increment of movement.

When the seated position of plunger 50 is reached, as shown in FIG. 4, a power-down function is inserted as described in connection with blocks 76 and 84 in FIG. 3, and current input to excitation winding 42 is reduced to one-tenth of its initial value. The resultant sustaining force developed between seating surfaces 106 and 114 and establishing abutting plane 96 remains a high value of about 242 grams. This seated hold-in force is more than adequate for purposes of retaining plunger 50 in its fully retracted position against spring loads as depicted at curve 100.

Other materials for plunger 50 and plug 52 can be utilized to derive a force-stroke curve essentially identical to that at 118 in FIG. 5 without the presence of extension 122 and its confronting recess. For instance, "LEDLOY AX," a product of Bliss and Laughlin Steel Co., is such a magnetic iron material and is characterized having the following additives: 0.09 percent C, max.; 0.85 – 1.15 percent Mn, 0.04 – 0.09 percent P; 0.26 – 0.35 percent S; 0.15 – 0.35 percent Pb; and 0.035 min Te.

Figure 9:
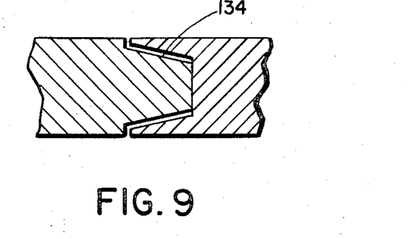
FIG. 9 is a partial view of nested confronting end faces of another form of solenoid armatures.

FIG. 5 also reveals representative force-stroke curves for more conventional approaches to solenoid design as they are applied to the instant performance criteria. For instance, curve 130 illustrates the force-stroke relationships of a solenoid structure having the working gap interface shown at 134 in FIG. 9. This gap is shaped as a frustum having a conical surface, the convergent half apex angle of which is selected as about 12° as opposed to the 8°–3' slope of the above-described end face arrangement. Seating surfaces for the comparative solenoid were internally disposed, as opposed to being formed about the end face periphery, as with the instant invention. The resultant force curve 130, while being generated from a higher excitation current level (1,150 milliamperes vs. 1,000 milliamperes, the same number of turns being present in each excitation winding) shows an unacceptable start-up force at stroke initiation. This start-up force is critical in view of the earlier discussed lag experienced for initial flux build-up upon energization of an excitation winding. Further, curve 130, while developing high forces in the last 0.025 inch of travel, evidences an unacceptable sustaining ability under power-down conditions at a fully nested orientation. A comparison of the pertinent portions of curve 130 with those of curve 118 readily illustrates the advantages of a peripherially disposed seating interface as discussed in conjunction with FIG. 4 at 96.

Figure 10:
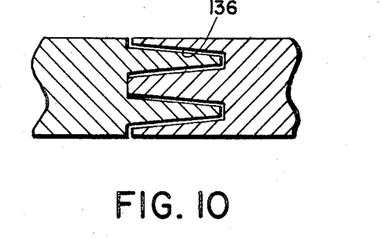
FIG. 10 is a partial view of nested confronting end faces of still another form of solenoid armatures.

The working gap interface for an internested configuration of end faces for the plug and plunger of a solenoid operating in accordance with curve 132 is depicted in FIG. 10 at 136. Curve 132 was evolved from a solenoid having confronting end faces with peripherially disposed seating surfaces, and also having an elongate internal extension. This internal extension is of a more shallow angle allowing it to have a height equivalent to plunger stroke. As seen in FIG. 10, the resultant corresponding converging apex half-angles of both the outer and inner conical surfaces are about 5°. While such an arrangement derives high starting forces at the initial position of the plunger, the shallow angles of the external conical surfaces result in an unacceptable negative force-stroke slope. Further, it is opined that the narrow slope of the configuration contributed to saturation of internesting end face components.

Those versed in the art at hand will recognize that the configurationos of the extensions and recesses of the end faces of the solenoid of the invention are readily formed using high volume automatic production techniques. The peripheral disposition of seating surfaces 114 and 106 renders them easily machined to close tolerances. Where such seating surfaces are formed internally within the end faces, such tolerances are much more difficult to achieve. Further, the relatively simplified conical surfaces of the confronting armature end faces of the invention also are easily machined using automatic procedures.

Since certain changes may be made in the above-described apparatus without departing from the scope of the invention herein involved, it is intended that all matter contained in the above description or shown in the accompanying drawings shall be interpreted as illustrative and not in a limiting sense.

What is claimed is:

1. Tractive electromagnetic apparatus comprising:
   an excitation winding;
   means establishing a magnetic circuit path about said winding, said means including stationary armature means and plunger means disposed centrally of said winding and having confronting end faces mutually nestable at a seated orientation, said plunger means being movable from an initial position through a stroke of given length into said seated orientation;
   said end faces being formed to define, when so nested, a first working gap interface of conically surfaced frustum shape, the apex half-angle slope of said conical surface being selected for deriving working gap flux linkage drive of said plunger during a first increment of said movement from said initial position,
   said end faces being further formed to define, when so nested, a second working gap conically surfaced interface disposed internally of said first interface, said second gap conical surface having a slope representing a cone apex half-angle other than said first interface half-angle and being selected for establishing working gap flux-linked drive during a second increment of said movement following said first increment of movement.

2. Tractive electromagnetic apparatus as described in claim 1 in which said second working gap interface is disposed internally from said first working gap interface a distance establishing an annulus shaped spacing therebetween defining end surfaces of predetermined areas.

3. Tractive electromagnetic apparatus as described in claim 2 in which said annulus shaped end surface area of said plunger means is selected for deriving working gap flux linked drive during said movement of said plunger means from 3'. initial position to said seated orientation.

4. Tractive electromagnetic apparatus as described in claim 1 in which said first working gap interface frustum shape has a height selected in correspondence with said given length of stroke.

5. Tractive electromagnetic apparatus as described in claim 1 in which said second interface apex half-angle is greater than said first interface half-angle.

6. Tractive electromagnetic apparatus as described in claim 1 in which said first working gap interface is disposed internally from the peripheries of said stationary armature means and said plunger means a distance defining an annulus shaped spacing therebetween establishing mutually contactable seating surfaces of predetermined areas.

7. Tractive electromagnetic apparatus as described in claim 6 in which said seating surface areas are selected to effect continued contact between said end faces by mutual magnetic attraction of given force values at a selectively reduced flux densities.

8. Tractive electromagnetic apparatus as described in claim 1 in which said second interface apex half-angle is greater than said first interface apex half-angle and is selected between about 18° and 30°.

9. Tractive electromagnetic apparatus as described in claim 1 in which said second interface apex half-angle is greater than said first interface apex half-angle and said first interface apex half-angle is selected as about 8°.

10. Tractive electromagnetic apparatus as described in claim 1 in which said second interface apex half-angle is selected as 22°–30' and said first interface apex half-angle is selected as 8°–3'.

11. A solenoid comprising:
    means defining an excitation winding;
    a stationary armature disposed centrally of said winding and forming part of a flux path;
    a plunger centrally disposed of said winding, aligned with said stationary armature and forming another part of said flux path;
    means establishing the continuity of said flux path about said winding;
    said stationary armature and said plunger being structured having axially aligned confronting end faces with co-extensive generally circular peripheries, said end faces having mutually internestible conically surfaced extensions and complementary recesses, said end faces further having complimentary, annulus shaped seating surfaces formed inwardly from said circular peripheries and arranged to establish the only mutually abutting contact between said end faces when fully internested.

12. A solenoid as described in claim 11 wherein said plunger and said stationary armature are mutually symmetrically disposed about and said plunger is movable along a stroke axis; and
    said seating surfaces are formed as planar surfaces substantially perpendicular to said stroke axis.

13. A solenoid as described in claim 12 wherein:
    said plunger is movable under flux linkage drive along said stroke axis from an initial position into a seated position establishing abutting contact between said seating surfaces; and the apex half-angle of convergence of a said conical surface of a said extension is selected for developing flux linkage drive in cooperation with a said seating surface when said plunger is at said initial position.

14. The solenoid of claim 13 in which said apex half-angle of convergence of said conical surface of said extension is selected as about 8°.

15. The solenoid of claim 13 wherein said annulus shaped seating surfaces are configured having areas selected to maintain said abutting contact by flux linkage when said excitation winding is energized at a power level diminished from that existing at the commencement of movement of said plunger at said initial position.

16. The solenoid as described in claim 13 wherein the length of said plunger movement from said initial to seated position is substantially equal to the height of a said extension.

17. The solenoid as described in claim 11 in which one said end face is configured having a first extension formed having a conical surface and as a right frustum the base of which coincides with the inner circular periphery of a said seating surface annulus, the side of said frustum opposite said base being configured to define one said recess.

18. The solenoid as described in claim 17 in which a said end face opposite said one end face is configured having another said extension formed with a conical surface and extensible within said first extension one recess.

19. The solenoid as described in claim 18 in which said one end face first extension is further formed to establish an annulus shaped end surface intermediate the outer circular periphery of said frustum opposite side and the periphery defining the entrance opening of said one recess.

20. The solenoid as described in claim 18 in which the half-apex angle of convergence of said other extension conical surface is greater than the half-apex angle of convergence of said one end face first extension conical surface.

21. A tractive electromagnetic device comprising:
means defining an excitation winding;
first armature means disposed centrally of said winding, forming part of a flux path, and being shaped having a right cylindrical outer periphery at the end face thereof, said end face being formed to define an annulus shaped seating surface extending inwardly from said outer periphery to an inner circular periphery, a recess formed inwardly of said inner periphery and having a conical surface shaped to define a right regular frustum, a conically surfaced extension formed within said recess; and second armature means forming another part of said flux path and having a circular outer periphery at the end face thereof, said second armature means end face being formed to define an annulus shaped seating surface extending inwardly from said outer periphery to an inner circular periphery and confronting and substantially co-extensive with said first armature means seating surface, said second armature means end face further including an extension nestable within and shaped in complement with said first armature means recess surface and formed as a right regular frustum having a base co-extensive with said second armature means end face inner circular periphery, said second armature means end face extension additionally being formed having a recess configured to receive said first armature means conically surfaced extension, said seating surfaces being mutually configured and arranged to establish the only mutually abutting contact between said end faces when fully internested.

22. A solenoid comprising:
means defining an excitation winding;
a stationary armature disposed centrally of said winding and forming part of a flux path;
a plunger centrally disposed of said winding, aligned along a common axis with said stationary armature and forming another part of said flux path;
means establishing the continuity of said flux path about said winding;
said stationary armature and said plunger being structured having axially aligned confronting end faces with co-extensive peripheries, one of said end faces being configured to define a conically shaped recess, said extension being symmetrically disposed about said common axis and a conically shaped extension formed within said recess, said recess and the other of said end faces being configured to define a conically shaped extension complementary to said one face recess and axially aligned therewith, said other end face being formed having a recess complementary to said one face extension and axially aligned therewith, said end faces being formed having complementary seating surfaces formed inwardly from said peripheries and arranged to establish the only mutually abutting contact between said end faces when said end faces are fully internested.

23. A solenoid as described in claim 22 wherein said plunger is movable along said common axis; and
said seating surfaces are formed as planar surfaces substantially perpendicular to said common axis.

24. A solenoid as described in claim 22 wherein:
said plunger is movable under flux linkage drive along said common axis from an initial position into a seated position establishing abutting contact between said seating surfaces; and
the apex half-angle of convergence of said conically shaped one face recess and other face extension is selected for developing flux linkage drive in cooperation with a said seating surface when said plunger is at said initial position.

25. The solenoid of claim 24 in which said apex half-angle of convergence of said conically shaped other face extension is selected as about 8°.

26. The solenoid of claim 24 wherein said seating surfaces are configured having areas selected to maintain said abutting contact by flux linkage when said excitation winding is energized at a power level diminished from that existing at the commencement of movement of said plunger at said initial position.

27. A solenoid as described in claim 24 wherein the length of said plunger movement from said initial to said seated position is substantially equal to the height of said other face extension.

* * * * *